(12) United States Patent
Liao

(10) Patent No.: US 7,022,227 B1
(45) Date of Patent: Apr. 4, 2006

(54) MULTIFUNCTIONAL FILTERING DEVICE FOR AN AQUARIUM

(76) Inventor: Shih-Hui Liao, 6F, No. 8-5, Lane 128, Sec. 1, Nan Chu Road, Luchu Hsiang, Taoyuan County (TW)

( * ) Notice: Subject to any disclaimer, the term of this patent is extended or adjusted under 35 U.S.C. 154(b) by 0 days.

(21) Appl. No.: 11/205,520

(22) Filed: Aug. 17, 2005

(51) Int. Cl.
*C02F 1/24* (2006.01)
*C02F 9/02* (2006.01)
*C02F 9/12* (2006.01)
*A01K 63/04* (2006.01)

(52) U.S. Cl. ............... 210/221.2; 210/169; 210/416.2; 210/184; 210/748; 210/198.1; 210/205; 210/181; 119/263; 119/264

(58) Field of Classification Search ............. 210/221.2, 210/169, 416.2, 184, 748, 198.1, 205, 181; 119/263, 264
See application file for complete search history.

(56) References Cited

U.S. PATENT DOCUMENTS

| | | | | |
|---|---|---|---|---|
| 5,078,867 A | * | 1/1992 | Danner | 210/169 |
| 5,385,665 A | * | 1/1995 | Neuhaus | 210/169 |
| 5,484,525 A | * | 1/1996 | Mowka, Jr. | 210/169 |
| 5,562,821 A | * | 10/1996 | Gutierrez-Collazo | 210/169 |
| 5,736,034 A | * | 4/1998 | Phillips et al. | 210/169 |
| 5,776,335 A | * | 7/1998 | Overath | 210/169 |
| 6,303,028 B1 | * | 10/2001 | Marks et al. | 210/169 |
| 6,732,675 B1 | * | 5/2004 | Liao | 119/259 |
| 6,808,625 B1 | * | 10/2004 | Wu | 210/221.2 |

* cited by examiner

*Primary Examiner*—Thomas M. Lithgow
(74) *Attorney, Agent, or Firm*—Thomas R. Vigil; Welsh & Katz, Ltd.

(57) ABSTRACT

A multifunctional filtering device for an aquarium mainly includes a filter box for being suspended at an aquarium. The filter box includes a pump motor for producing mixture of water and air and a vortex flow generator disposed at the center of the inner side of the bottom thereof and in communication with a water outlet disposed at the pump motor. A bubble collector is disposed at the top of the vortex flow generator. The filter box may be suspended inside or outside the aquarium. The filter box includes a water input pipe unit and a water output pipe unit which may be differently configured in accordance with the suspension position of the filter box. The water output pipe unit may be further disposed with a heating rod or ultraviolet sterilization lamp for heating or sterilizing breeding water in the aquarium.

5 Claims, 10 Drawing Sheets

MULTIFUNCTIONAL FILTERING DEVICE FOR AN AQUARIUM

FIELD OF THE INVENTION

The present invention relates to a multifunctional filtering device for an aquarium, and particularly to a multifunctional filtering device which may be suspended inside or outside an aquarium for filtering, heating or sterilizing water in the aquarium.

BACKGROUND OF THE INVENTION

When a conventional filtering device for an aquarium is designed to be suspended inside the aquarium, it cannot be suspended outside the aquarium. Or when a conventional filtering device for an aquarium is designed to be suspended outside the aquarium, it cannot be suspended inside the aquarium. Thus, the filtering device is limited in use.

In addition, a conventional filtering device is configured in accordance with a desired function with the structure thereof being fit to a specific condition. However, the filtering device may not be applied at another condition. For example, a bubble remove device for seawater breeding and a sponge filtering device for freshwater breeding are not replaceable with each other. That's, when a person wants to change freshwater breeding to seawater breeding, the formerly used sponge filtering device cannot be used in the seawater breeding and so a new bubble remove device is required. Therefore, it is important to make the bubble remove device and the sponge filtering device replaceable for reducing breeding cost.

In addition, a conventional filtering device has not functions of heating and sterilizing breeding water in the aquarium. Additional heating or sterilizing apparatus is required to suspend at the aquarium for heating or sterilizing the breeding water in the aquarium, which causes the aquarium in disarray. Furthermore, the static suspension manner results in limited heating and sterilizing effects. Thus, it is also important to improve heating and sterilizing effects on breeding water and avoid the heating or sterilizing apparatus from adversely affecting aesthetic feeling of the aquarium.

SUMMARY OF THE INVENTION

Accordingly, a main object of the present invention is to provide a multifunctional filtering device for an aquarium which may be suspended inside or outside an aquarium through a combination of a filter box and a suspension device thereof.

Another object of the present invention is to provide a multifunctional filtering device for an aquarium which may be used in seawater breeding or freshwater breeding for filtering breeding water in the aquarium through replacement between a bubble collector and a filter sponge bundle.

A further object of the present invention is to provide a multifunctional filtering device for an aquarium which may be disposed with a heating rod or ultraviolet sterilization lamp in a water output pipe unit thereof thereby achieving functions of heating or sterilizing breeding water in the aquarium and effectively receiving the heating rod or ultraviolet sterilization lamp for avoiding the aquarium from disarraying.

Other objects, advantages and novel features of the present invention will be drawn from the following detailed embodiment of the present invention with attached drawings, in which:

DESCRIPTION OF THE PREFERRED EMBODIMENTS

Figure 1:
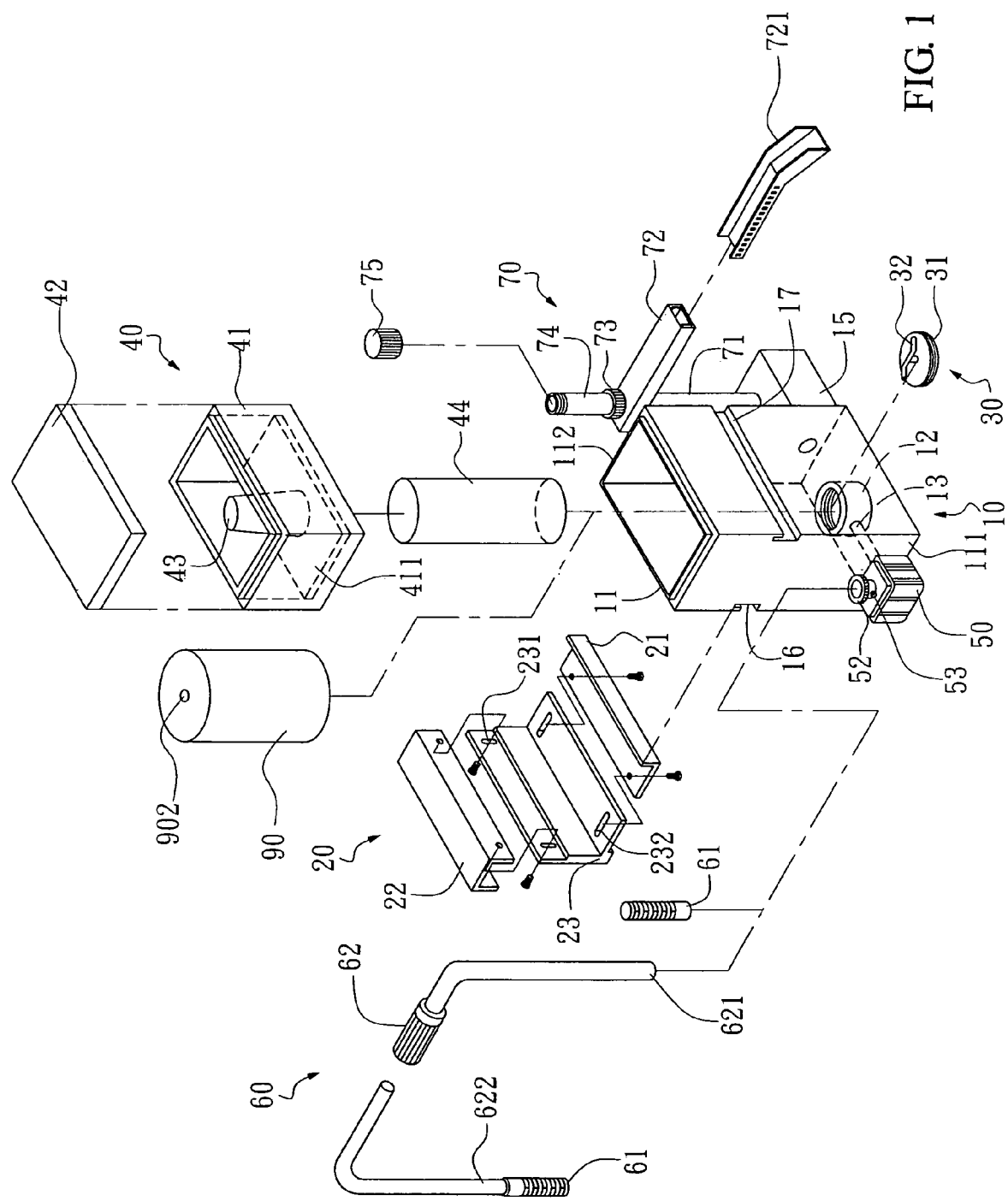
FIG. 1 is an exploded view of a multifunctional filtering device for an aquarium of the present invention.
Figure 2:
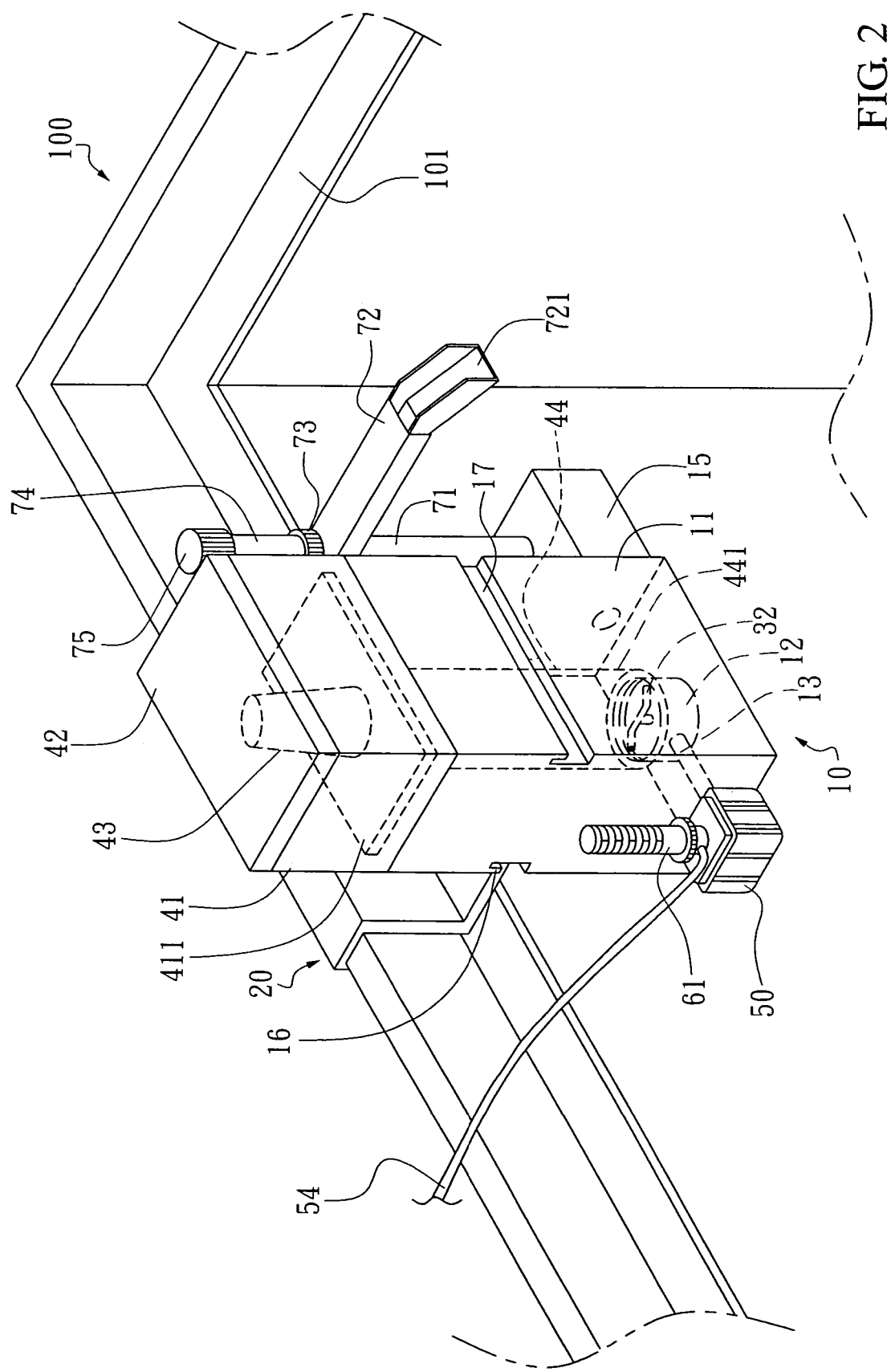
FIG. 2 is a schematic view showing the multifunctional filtering device for an aquarium in accordance with a first embodiment of the present invention being disposed inside an aquarium.

Referring to FIGS. 1–2, a multifunctional filtering device for an aquarium of the present invention is mainly disposed at a seawater aquarium 100 for providing filtering function for breeding water in the aquarium 100. The multifunctional filtering device for an aquarium includes a filter box 10, a suspension device 20, a vortex flow generator 30, a bubble collector 40, a pump motor 50, a water input pipe unit 60 and a water output pipe unit 70. The filter box 10 includes a rectangular casing 11 which is open at the top thereof. A cylindric positioning seat 12 is disposed at the inner side of the center of the bottom of the rectangular casing 11. The rectangular casing 11 includes first and second lateral sidewalls 111, 112 and two longitudinal sidewalls (not labeled) connected between the lateral sidewalls 111, 112. A water transportation pipe 13 extends through a bottom portion of the first lateral sidewall 111 and the positioning seat 12. A water output pipe fixing seat 15 is disposed at the outer side of a bottom portion of the second lateral sidewall 112 and in communication with the rectangular casing 11. Horizontal locking grooves 16, 17 are respectively defined in the outer side of the longitudinal sidewalls of the rectangular casing 11.

The suspension device 20 includes a latching member 21 at one end thereof for engaging with one of the locking grooves 16, 17, a fixing member 22 at the other end thereof for fixing at the top of one of the sidewalls of the aquarium 100 and an L-shaped intermediate support member 23 connected between the latching member 21 and the fixing member 22. A plurality of symmetrical elongate slots 231, 232 is defined opposite flanges of the L-shaped intermediate support member 23 for fixing the fixing member 22 and the latching member 23 through bolts (not labeled) respectively. The fixing member 22 is vertically movable along the elongate slots 231 and the latching member 23 is horizontally movable along the elongate slots 232, whereby the suspension device 20 is adjustable to fit to different panels 101 with different width or different depth from the top of the sidewalls.

The vortex flow generator 30 includes a disk 31 for fixing at the interior of the positioning seat 12 and a lateral symmetrical sprayer 32 disposed at the top of the disk 31 and extending through a bottom portion of the disk 31.

The bubble collector 40 includes a box 41 for fixing at the top of the rectangular casing 11. An opening (not labeled) is defined in the top of the box 41 for covering with a cover plate 42. A constriction pipe 43 upwardly extends through the center of a bottom portion 411 of the box 41 and near the cover plate 42. The constriction pipe 43 has a fixing end 431 at the lower end thereof disposed at the outer side of the bottom portion 411 for connecting with a hollow guiding pipe 44 which has a slightly larger diameter than the positioning seat 12. A lower edge 441 of the hollow guiding pipe 44 extends to the outer side of the top of the positioning seat 12.

Figure 10:
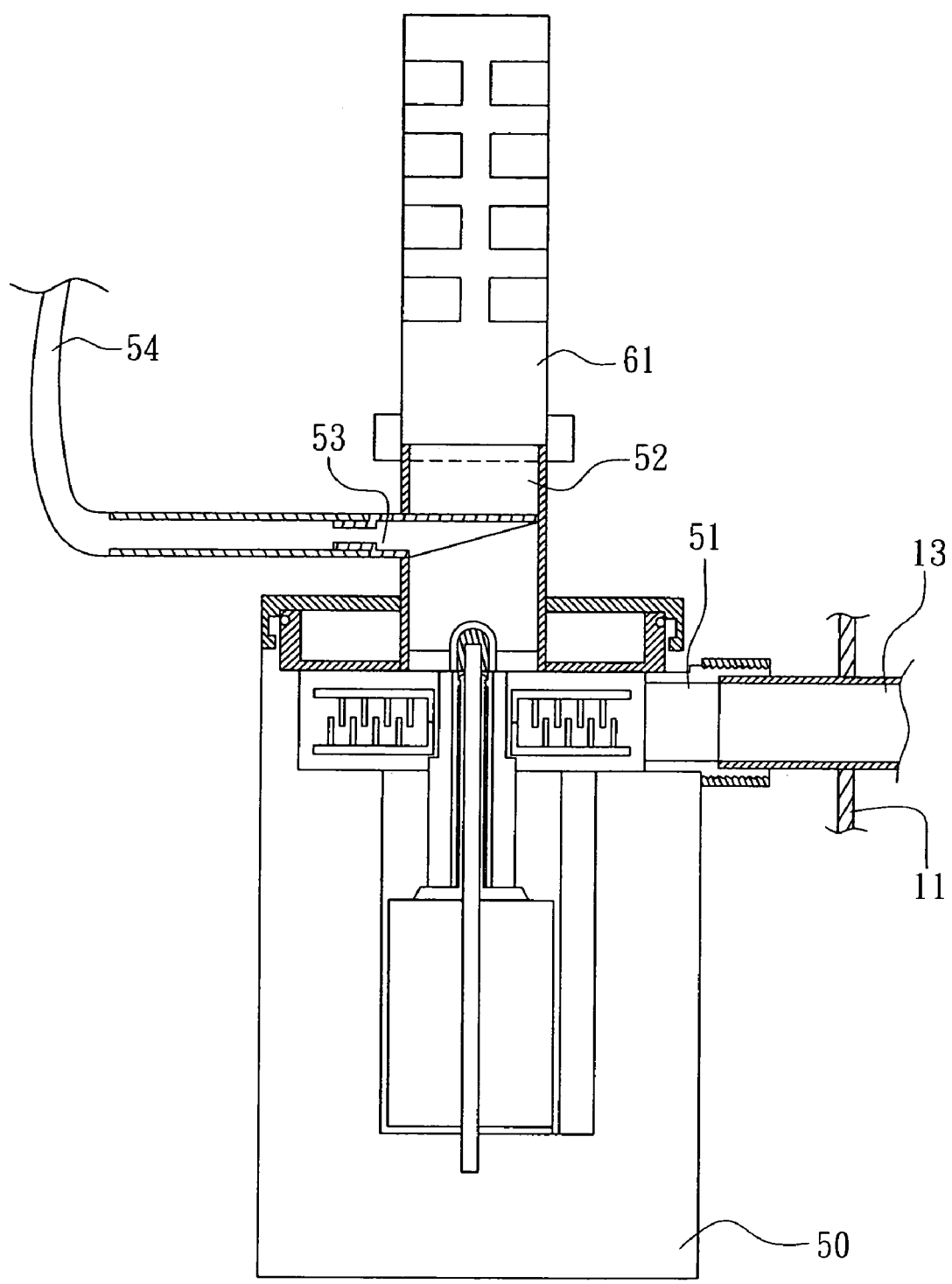
FIG. 10 is a cross-sectional view showing a pump motor of the present invention.

The pump motor 50 has a water outlet 51 connecting the outer edge of the water transportation pipe 13 thereby fixing the pump motor 50 (see FIG. 10), and a water inlet 52. An air intake 53 is defined in a side of the pump motor 50 disposed with the water inlet 52 for connecting with an air input pipe 54.

The water input pipe unit 60 has a water pipe head 61 which is fixed at the water inlet 52 of the pump motor 50 and can prevent big feculences from entering therein.

The water output pipe unit 70 includes a water output pipe 71 upwardly extending from the water output pipe fixing seat 15, a horizontal flow guiding pipe 72 near the top of the water output pipe 71 and in communication with the water output pipe 71, and a rotatable ring 73 at the top of the water output pipe 71 for adjusting flowrate of output water. A hollow pipe 74 integrally extends from the top of the rotatable ring 73 with a proper length and in communication with the water output pipe 71. In addition, a sealing cover 75 is threadedly disposed at the top of the hollow pipe 74.

Since the water pipe head 61 fixed at the water inlet 52 of the pump motor 50 is short, the above configuration is preferred to suspend the multifunctional filtering device for an aquarium inside the aquarium 100 (here, the latching member 21 of the suspension device 20 engages with the locking groove 16 of the rectangular casing 11), whereby the water pipe head 61 deep into breeding water draws the breeding water for filtering, as shown in FIG. 2.

Figure 3:
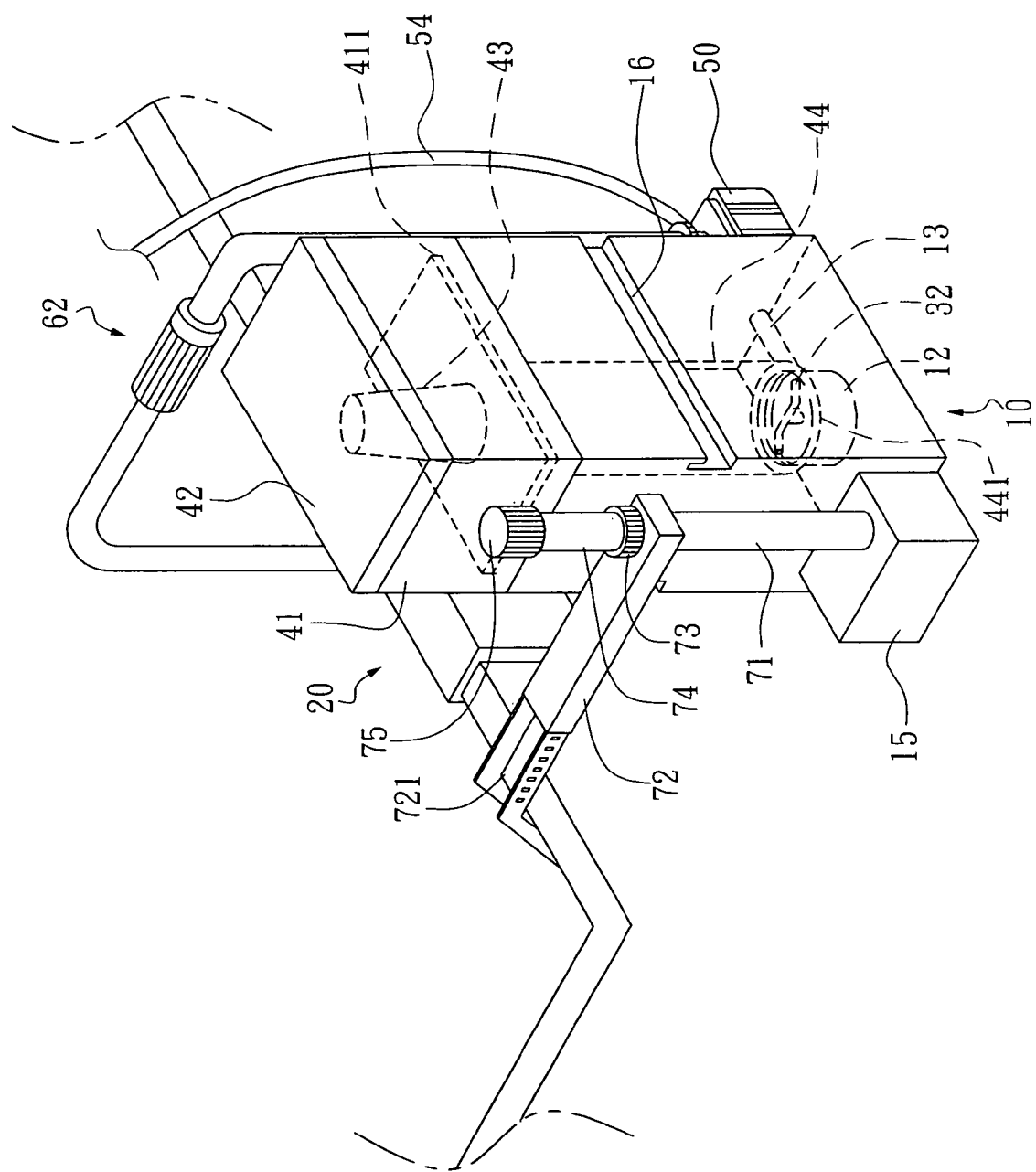
FIG. 3 is a schematic view showing the multifunctional filtering device for an aquarium in accordance with the first embodiment of the present invention being disposed outside an aquarium.

When the multifunctional filtering device for an aquarium is desired to suspend outside the aquarium 100, the latching member 21 of the suspension device 20 engages with the locking groove 17 of the rectangular casing 11, as shown in FIG. 3. Here, since the pump motor 50 is disposed outside the aquarium 100, the water input pipe unit 60 further includes a laterally movable reversed U-shaped water guiding pipe unit 62. The water guiding pipe unit 62 includes one end 621 fixed at the water inlet 52 of the pump motor 50, and the other end 622 connecting the water pipe head 61, as shown in FIG. 1. Since the water guiding pipe unit 62 is reversed U-shaped, the water pipe head 61 connected to the free end of the water guiding pipe unit 62 enters breeding water in the aquarium 100 for drawing the breeding water for filtering. In addition, since the horizontal flow guiding pipe 72 of the water output pipe unit 70 may be too short to enter the interior of the aquarium 100 for the multifunctional filtering device for an aquarium is disposed outside the aquarium 100, the horizontal flow guiding pipe 72 further includes an extension flow guiding trough 721 which is retractably movable inside and outside. When the extension flow guiding trough 721 is outwardly pulled, the horizontal flow guiding pipe 72 extends into the interior of the aquarium 100 whereby the filtered breeding water flows back to the aquarium 100.

Figure 4:
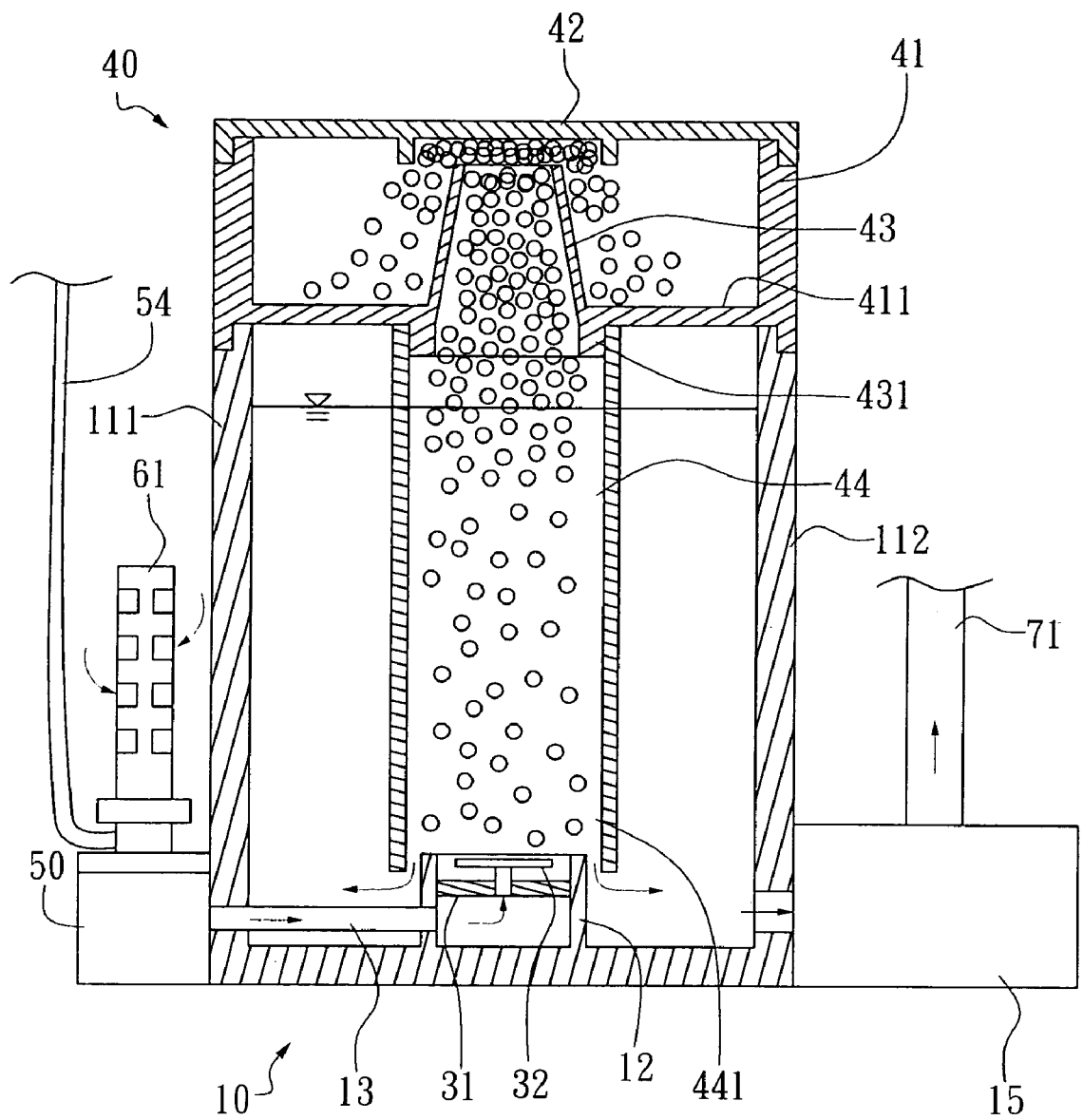
FIG. 4 is a partially cross-sectional view of the multifunctional filtering device for an aquarium in accordance with the first embodiment of the present invention.
Figure 5:
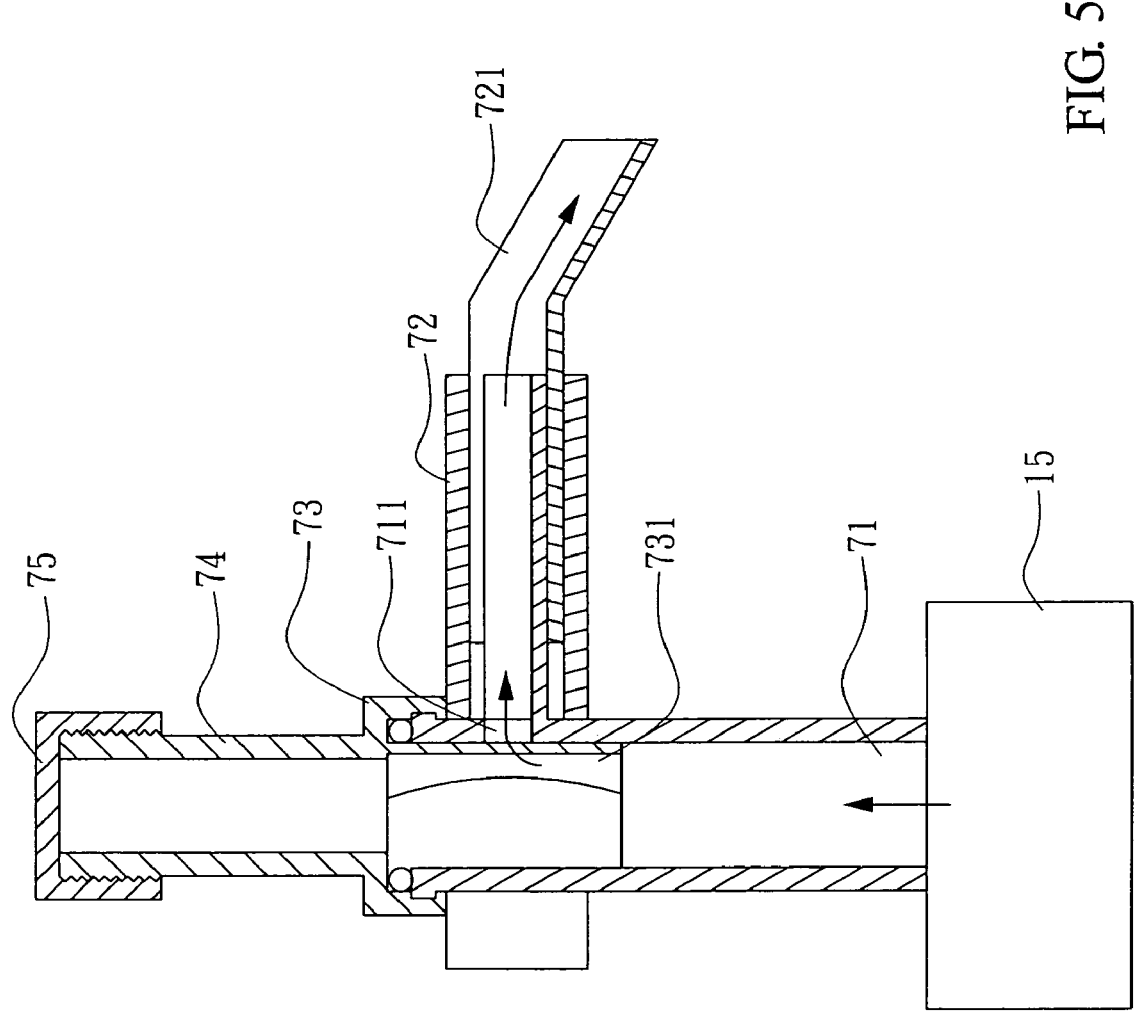
FIG. 5 is a cross-sectional view of a water output pipe unit of the present invention.

As shown in FIGS. 4–5, in operation, when the pump motor 50 is actuated, breeding water enters the water pipe head 61, and flows through the water transportation pipe 13 to the positioning seat 12, and then is spurted from the lateral symmetrical sprayer 32 of the vortex flow generator 30. Since the pump motor 50 is defined with the air input pipe 54, when the breeding water is drawn, air is simultaneously drawn through the air input pipe 54 thereby forming mixture of air and water. Thus, once the breeding water is spurted and flows around the inner side of the positioning seat 12, the air contained in the breeding water forms highly tiny and dense air bubbles which upwardly float in the hollow guiding pipe 44 of the bubble collector 40. Since the air bubbles provide function of adsorbing feculences in the breeding water, when the air bubbles float upwardly and over the top of the constriction pipe 43, the feculences in the breeding water float with the air bubbles and accumulate in the box 41 of the bubble collector 40 thereby achieving filtering effect.

In addition, the filtered breeding water flows back to the rectangular casing 11 from the bottom of the hollow guiding pipe 44 and then flow to the water output pipe 71 of the water output pipe unit 70 for upwardly flowing out. Referring to FIG. 5, when the breeding water upwardly flows from the water output pipe 71, the breeding water flows through the outlet 711 of the water output pipe 71 and to the horizontal flow guiding pipe 72, and then flows back to the aquarium 100 through the extension flow guiding trough 721 thereby achieving circulation of the breeding water. Moreover, since a valve 731 which is blockable the outlet 711 is disposed at the inner side of the rotatable ring 73 disposed at the top of the water output pipe 71, output flow rate of the breeding water is adjustable through adjusting the relationship between the valve 731 and the outlet 711.

Figure 6:
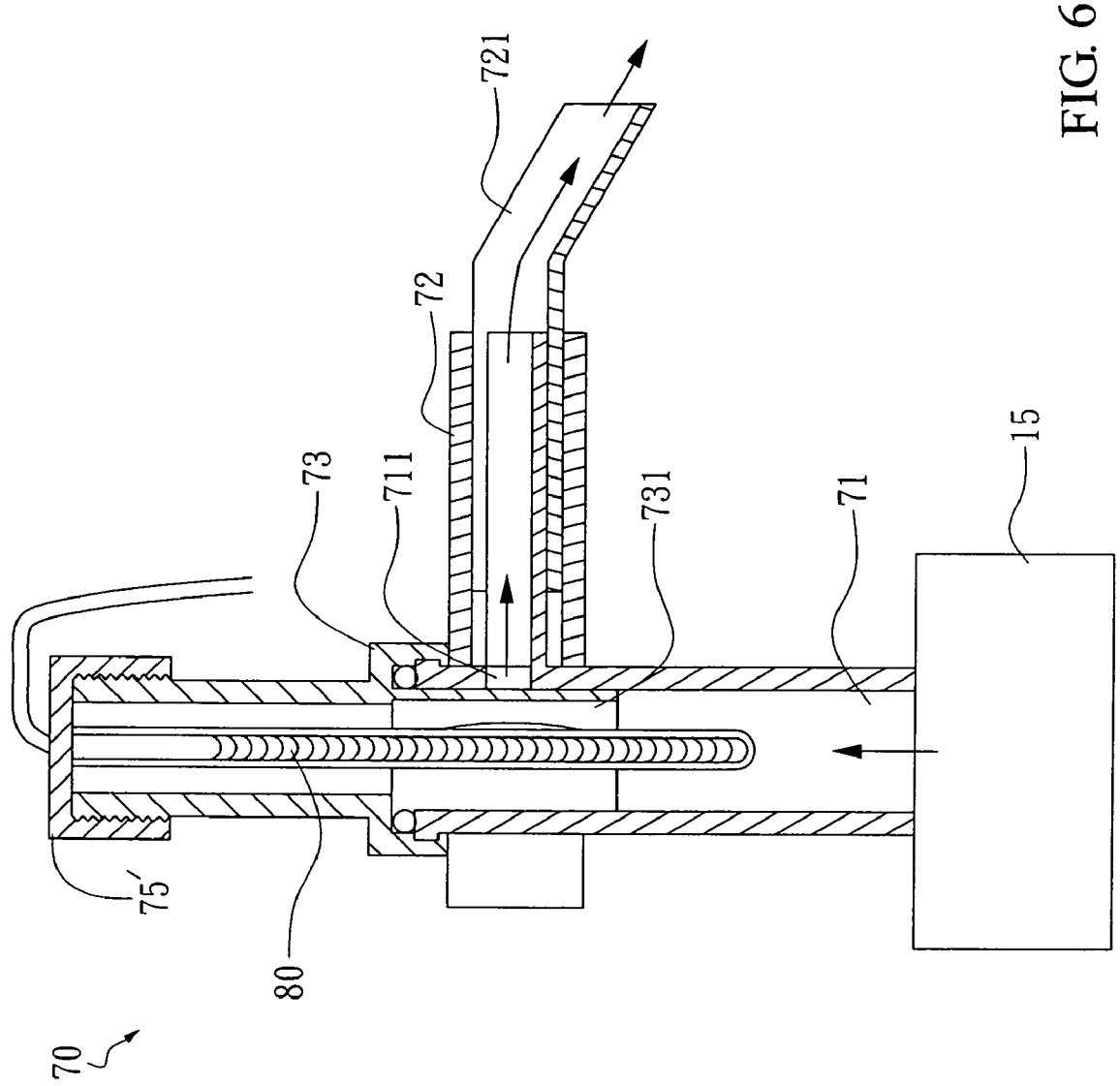
FIG. 6 is a cross-sectional view showing the water output pipe unit shown in FIG. 5 being disposed with a heating rod (or an ultraviolet sterilization lamp)

In addition, when the sealing cover 75 of the hollow pipe 74 disposed at the top of the rotatable ring 73 is replaced with a sealing cover 75' disposed with a heating rod (or ultraviolet sterilization lamp) 80 as shown in FIG. 6, the breeding water flowing through the water output pipe unit 70 is simultaneously heated or sterilized. Since the breeding water flows circularly, the heating rod (or the ultraviolet sterilization lamp) 80 can completely heat or sterilize the aquarium 100. Moreover, the heating rod (or the ultraviolet sterilization lamp) 80 is received in the filtering device, which greatly improves configuration of the aquarium.

Figure 7:
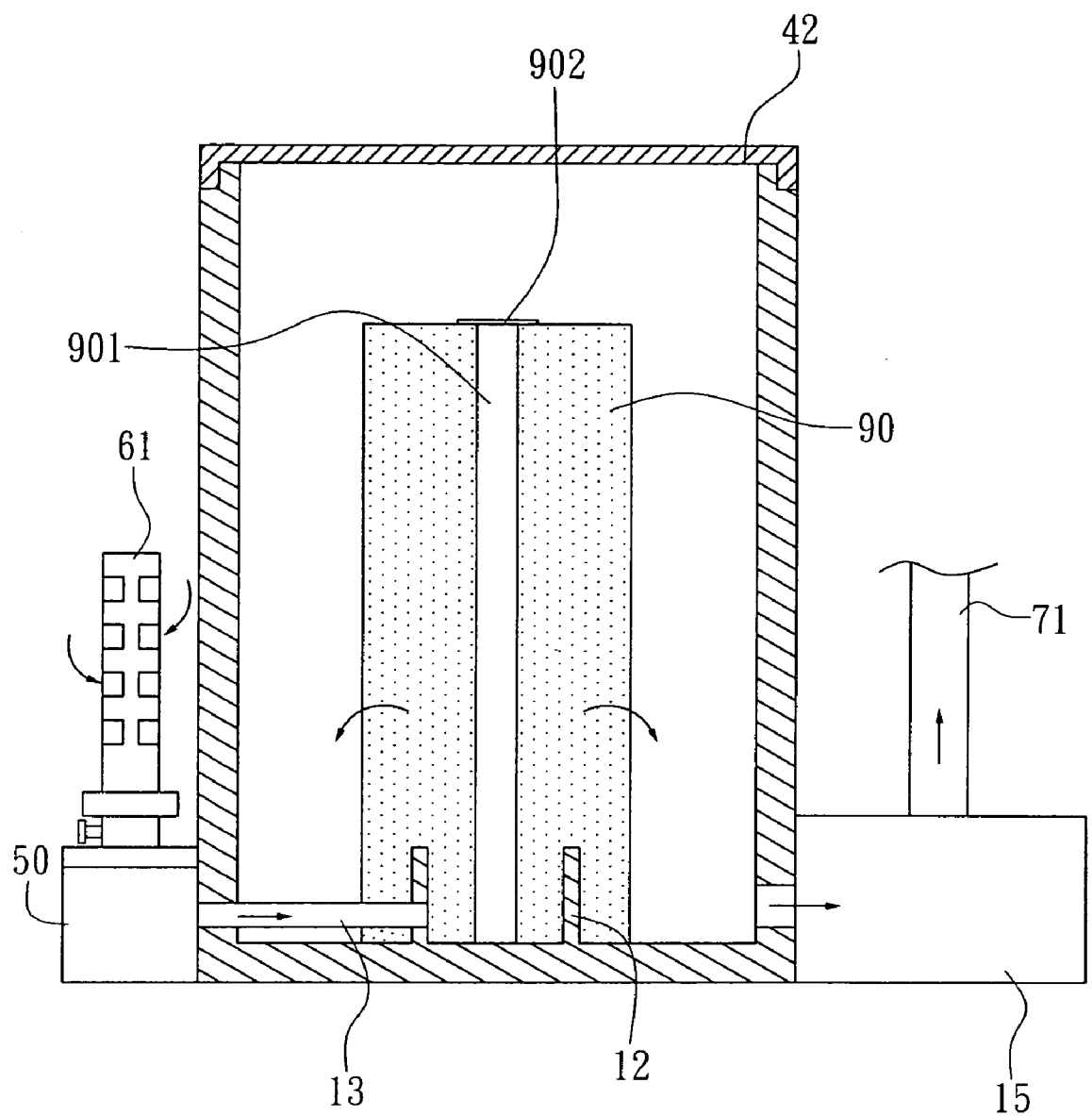
FIG. 7 is a partially cross-sectional view of a multifunctional filtering device for an aquarium in accordance with a second embodiment of the present invention.

In addition, in order to use the multifunctional filtering device for an aquarium of the present invention in a freshwater aquarium 100', the bubble collector 40, the hollow guiding pipe 44 and the vortex flow generator 30 are removed form the multifunctional filtering device for an aquarium, and then a cylindric filter sponge bundle 90 is fixed at the positioning seat 12. The filter sponge bundle 90 includes a longitudinal water pressure buffering channel 901 and a sealing plate 902 disposed at the top of the water pressure buffering channel 901 as shown in FIG. 7. The sealing plate 902 can be lifted by water pressure. Moreover, the cover plate 42 which is disposed at the top of the bubble collector 40 for seawater breeding is moved to cover the top of the rectangular casing 11. Since it is not required to collect feculences in the breeding water through air bubbles for the freshwater aquarium 100', the air input pipe 54 disposed at the pump motor 50 is detached and the air intake 53 is closed or sealed.

As shown in FIG. 7, in operation of the multifunctional filtering device for a freshwater aquarium, when the pump motor 50 is actuated, the breeding water enters from the water pipe head 61 and flows from the water transportation pipe 13 to the positioning seat 12, and then flows through the filter sponge bundle 90 for filtering. The filtered breeding water further flows through the rectangular casing 11 and then flows out from the water output pipe unit 70. Operation related to the water output pipe unit 70 is the same as described in FIG. 5 or 6.

Since the filter sponge bundle 90 has the longitudinal water pressure buffering channel 901 as shown in FIG. 7, even if the water flow from the water transportation pipe 13 has a relatively high pressure, the water pressure is reduced through the water pressure buffering channel 901, thereby preventing the filter sponge bundle 90 from upwardly floating. Since the filter sponge bundle 90 has a function of filtering feculences in the breeding water, as long as the filter sponge bundle 90 is not obstructed by the feculences, the filtered breeding water can directly flow out along the lateral direction of the filter sponge bundle 90. However, once the filter sponge bundle 90 is used for a certain period of time, feculences in the breeding water gradually and upwardly deposit from the bottom of the filter sponge bundle 90 and so the breeding water cannot flow through the lower portion of the filter sponge bundle 90 due to obstruction of the feculences. That's, a position at which the breeding water flows through the filter sponge bundle 90 is higher and higher as time goes on. Finally, water flow will upwardly flow through the water pressure buffering channel 901 and therefore upwardly push the sealing plate 902 disposed at the top of the water pressure buffering channel 901 thereby providing an alarm to a user for replacing the filter sponge bundle 90.

Figure 8:
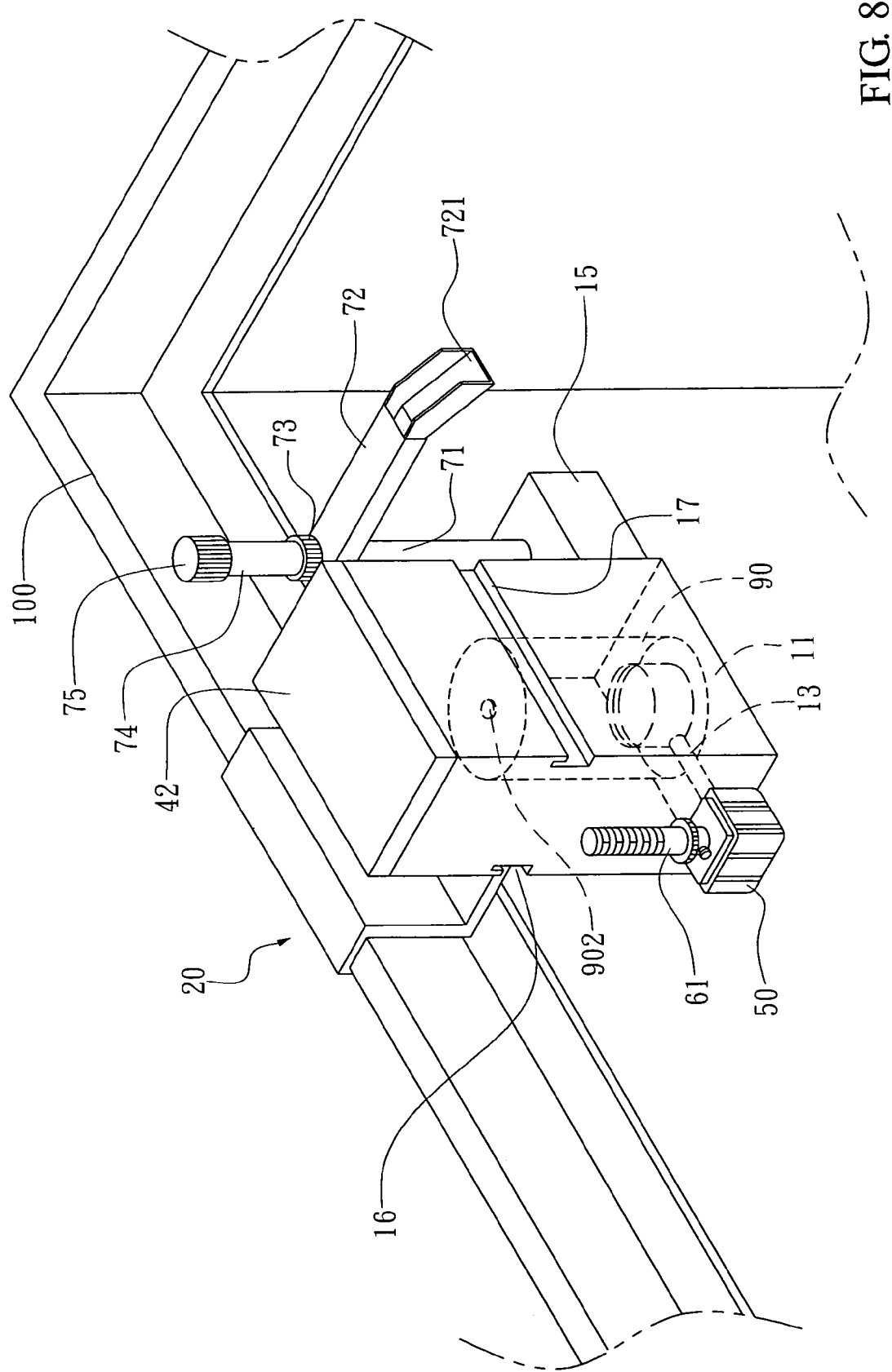
FIG. 8 is a schematic view showing the multifunctional filtering device for an aquarium in accordance with the second embodiment of the present invention being disposed inside an aquarium.
Figure 9:
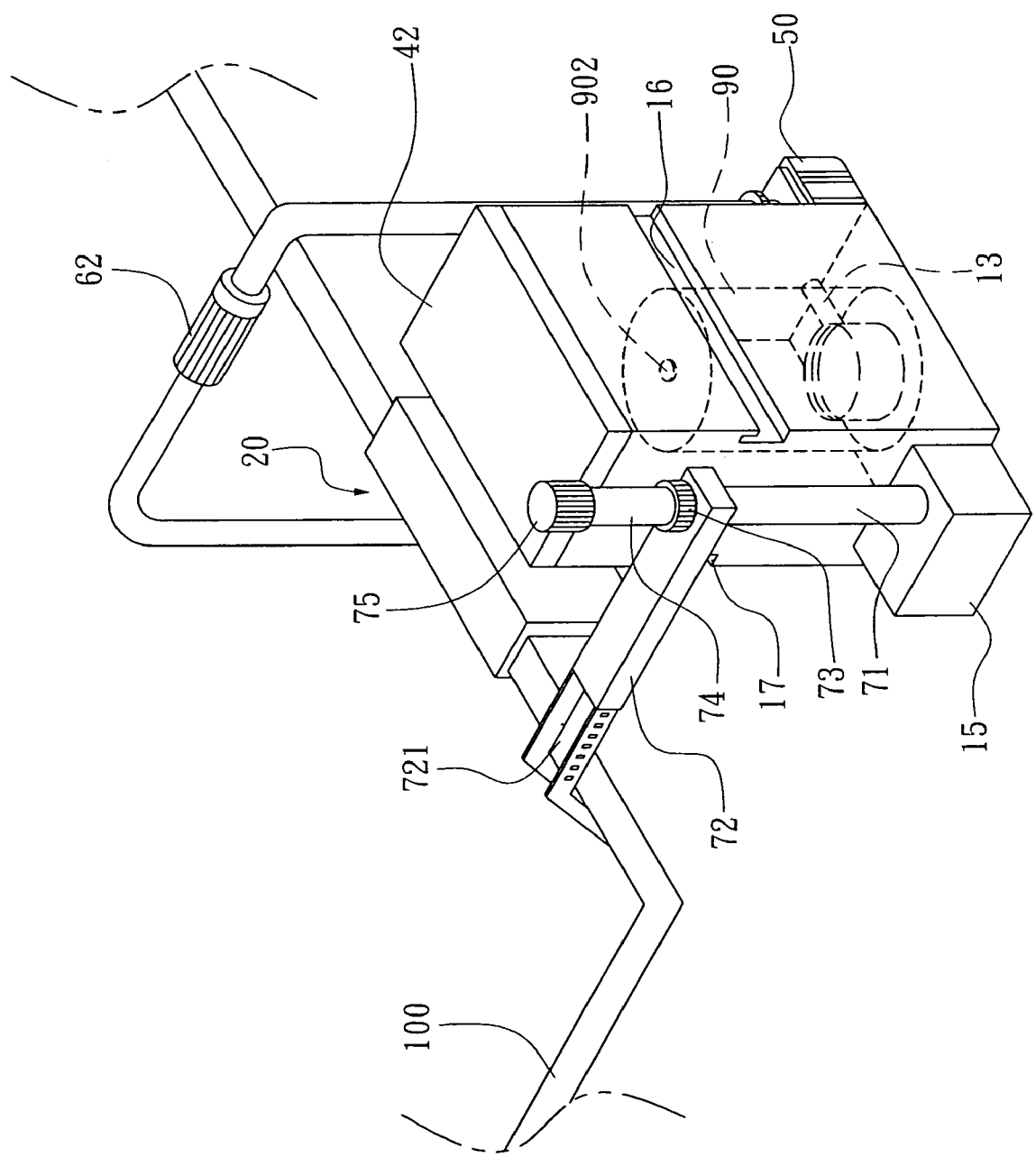
FIG. 9 is a schematic view showing the multifunctional filtering device for an aquarium in accordance with the second embodiment of the present invention being disposed outside an aquarium.

FIGS. 8 and 9 are schematic views showing the multifunctional filtering device for a freshwater aquarium is respectively disposed inside and outside the aquarium 100'.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multifunctional filtering device for an aquarium mainly disposed at the aquarium for filtering breeding water in the aquarium, the multifunctional filtering device for an aquarium comprising:

a filter box comprising a rectangular casing with an opened top portion, the rectangular casing comprising a cylindric positioning seat at the center of the inner side of the bottom thereof, a water transportation pipe at a bottom portion of a first lateral sidewall and in communication with the sidewall and the positioning seat, a water output pipe fixing seat at the outer side of a bottom portion of a second lateral sidewall and in communication with the rectangular casing, and horizontal locking grooves respectively defined in outer sides of two longitudinal sidewalls of the rectangular casing;

a suspension device comprising a latching member at one end thereof for engaging with the locking groove and a fixing member at the other end thereof fixed at the top of one of the sidewalls of the aquarium;

a vortex flow generator comprising a disk fixed inside the positioning seat and a lateral symmetrical sprayer disposed at the top of the disk and communication with the bottom of the disk;

a bubble collector comprising a box fixed at the top of the rectangular casing, the box comprising an opening at the top thereof for covering with a cover plate, and a constriction pipe at the center of the bottom thereof, in communication with the bottom thereof and upwardly extending to near the cover plate, a fixing end being disposed at the lower end of the constriction pipe and outside the bottom of the box for connecting with a hollow guiding pipe with a diameter being slightly larger than that of the positioning seat, the lower edge of the hollow guiding pipe extending to the outer side of the top of the positioning seat;

a pump motor comprising a water outlet connecting with the outer end of the water transportation pipe and a water inlet, the pump motor being further defined with an air intake at the side of the water inlet for connecting with an air input pipe;

a water input pipe unit comprising a water pipe head fixed at the water inlet of the pump motor for blocking large feculences from entering therein; and a water output pipe unit comprising a water output pipe upwardly extending from the water output pipe fixing seat and a horizontal flow guiding pipe near the top of the water output pipe and in communication with the water output pipe, a rotatable ring being disposed at the top of the water output pipe for adjusting flowrate of output water, a hollow pipe intergrally extending from the top of the rotatable ring with a proper length and in communication with the water output pipe, a sealing cover being threadedly disposed at the top of the hollow pipe.

2. The multifunctional filtering device for an aquarium as claimed in claim 1, wherein the suspension device further comprises an L-shaped intermediate support member, and a plurality of symmetrical elongate slots is defined in opposite end flanges of the L-shaped intermediate support member for respectively connecting with the fixing member and the latching member.

3. The multifunctional filtering device for an aquarium as claimed in claim 1, wherein the water input pipe unit further comprises a laterally movable reversed U-shaped water guiding pipe unit, and the water guiding pipe unit has an end fixed at the water inlet of the pump motor and the other end fixed with the water pipe head.

4. The multifunctional filtering device for an aquarium as claimed in claim 3, wherein the horizontal flow guiding pipe of the water output pipe unit is further disposed with an extension flow guiding trough moveable inside and outside.

5. The multifunctional filtering device for an aquarium as claimed in claim 1, wherein the sealing cover of the hollow pipe of the water output pipe unit is disposed with a heating rod or ultraviolet sterilization lamp in the inner side thereof.

* * * * *